United States Patent [19]

Carlsson et al.

[11] 4,125,976
[45] Nov. 21, 1978

[54] WINDOW OR DOOR FRAME

[75] Inventors: Karl I. Carlsson; Sven T. Akesson, both of Tidaholm, Sweden

[73] Assignee: Aktiebolaget Bofors, Bofors, Sweden

[21] Appl. No.: 782,686

[22] Filed: Mar. 30, 1977

[30] Foreign Application Priority Data

Apr. 5, 1976 [SE] Sweden ............................ 7603971

[51] Int. Cl.² ............................................. E06B 1/04
[52] U.S. Cl. ................................................. 52/217
[58] Field of Search ............... 52/208, 213, 214, 215, 52/217, 475, 211, 212, 512, 509, 510, 235, 507

[56] References Cited

U.S. PATENT DOCUMENTS

| | | | |
|---|---|---|---|
| 2,672,959 | 3/1954 | Young | 52/212 |
| 2,834,997 | 5/1958 | Webb | 52/213 |
| 2,902,727 | 9/1959 | Sanolis | 52/217 X |
| 3,367,078 | 2/1968 | Thompson, Jr. | 52/507 |
| 3,555,736 | 1/1971 | Koch, Jr. et al. | 52/208 X |

*Primary Examiner*—Price C. Faw, Jr.
*Assistant Examiner*—Carl D. Friedman
*Attorney, Agent, or Firm*—Pollock, Vande Sande & Priddy

[57] ABSTRACT

A door or window frame assembly adapted to fit within a hole in a support surface of varying thickness and comprising a central frame consisting of one or more L-shaped members positioned such that one leg overlaps a side portion of the support surface. A separate U-shaped clamping strip with legs of varying lengths is positioned on the opposite side portion of the support surface and functions to clamp the frame member in position, with the clamping member being reversible to compensate for support surfaces of varying thicknesses.

10 Claims, 4 Drawing Figures

WINDOW OR DOOR FRAME

BACKGROUND OF THE INVENTION

The present invention relates to an easily installed window or door frame, primarily intended for trailer bodies but which can also be used for other purposes.

Trailer bodies are built essentially by hand. Moreover, they are constructed of a variety of materials, with a variety of insulating materials. Consequently, the wall thickness may vary substantially in different models of trailers.

Even if the actual trailer bodies are made by hand, it is advantageous to mass produce certain parts for use by a number of trailer body manufacturers in the manufacture of a wide variety of trailer bodies. The window unit is one of the parts falling in this category.

The window itself does not present any real difficulty in manufacture, and, as a rule, is made of some appropriate plastic, e.g. acrylic plastic. Such windows are, moreover, already being mass produced by specialized manufacturers.

However, due to the great variation in wall thickness of various trailer bodies, different window frames of varying thickness are required. There are, of course, frames adjustable to different wall thicknesses, but generally the installation of these frames is time-consuming. Such frames are constructed from a number of parts with more than one person being needed for the actual installation work since such frames actually comprise two frames telescoped into each other from the outside or inside of the trailer body. Further, frames of this type have often been made of cold-conducting metal, which significantly reduces the sealing effect of the frame.

OBJECTS AND SUMMARY OF THE INVENTION

The purpose of the present invention is to provide a frame which can easily be installed by one person, who can insert the frame entirely from the inside of the trailer body, despite the presence of the window pane. The frame of the invention does not require any pre-fixing by means of wedges or the like, and there are comparatively liberal requirements for the tolerances of the wall opening. A certain amount of play is permissible between the outer surface of the frame and the inner surface of the support wall.

The main part of the frame of the invention consists of a main frame constructed of a single part of formed by joining several separated parts. The main frame should be constructed of a material which is not cold-conducting. Plastic material with a cellular structure has an insulating effect, and is therefore particularly suitable. Extrusion or injection moulding of some appropriate plastic material, e.g. polyurethane, also makes it possible to directly attach to the frame a variety of elements such as fasteners for window hinges, stops for lock handles, drip and seal grooves or mouldings and reinforced fastening points for positioning the clamping strips during installation of the frame.

The frame according to the invention comprises a main frame constructed from pairs of opposite transversal and longitudinal frame parts. For the general, rectangular window, the parts of the frame form right angles to each other. This main frame is inserted into an opening in the wall in such a way that the outer edge surfaces slope away from each other and are joined to the inner edge surfaces of the walls which face each other. Between these edge surfaces, a certain degree of play is tolerated. Play of up to 5-10 mm is possible, even if play of more than 5 mm is unsuitable from the point of view of insulation. The only critical factor is that the opening in the wall is not too small for the frame.

The acrylic plastic windows themselves should be formed with rounded corners. Casements are not needed for double acrylic plastic windows, but the actual frame should be adaptable to fit in wall openings with sharp corners.

The frame of the invention includes an outer flange which is clamped against the wall during installation of the frame. This flange is attached to the outer edge surfaces of the frame and is positioned at a substantially right angle thereto. The flange contacts the part of the outer wall which is adjacent the window opening. The frame is thereafter secured in place by clamping strips positioned to contact both the inside of the frame and the inner wall adjacent the window opening.

The clamping strip of the invention consists of a shallow U-shaped clamping strip, the body of which is rather wide compared with the height of its two upwardly extending flanges. A characteristic feature of the invention is that one of these two flanges (which can be of different lengths) contacts and is aligned with an adjacent part of the frame, while the other flange contacts the wall adjacent the window opening. The clamping strip is connected with the frame in such a way that the cross-section of the clamping strip can be positioned obliquely in relation to the main plane of the frame.

Through this arrangement, the same frame assembly can be installed in different wall openings of varying thicknesses. If the longer flange of the clamping strip is in contact with the frame, the frame will fit in wall openings which are thicker than the frame, while if the shorter flange of the clamping strip is in contact with the frame, the frame will fit into wall openings thinner than the frame.

The clamping strip can be set at an oblique angle and retained in position by fastening screws connecting the clamping means to respective parts of the frame. This oblique setting compensates for variations in wall thickness. If the wall and frame should be of the same thickness, a U-shaped clamping strip with substantially identical flanges can be used.

One side of the frame is provided with guide grooves for engagement with the flanges of the clamping strip, while the flange attached to the frame and abutting the wall is provided with a groove for inserting sealing paste.

The frame of the invention, which can also be used for light doors, may be supplied to the trailer manufacturer complete with inserted windows or doors. Thereafter, the frame can be installed without removal of the window or door.

BRIEF DESCRIPTION OF THE DRAWINGS

The invention will now be described in detail with reference to the accompanying drawings in which.

DESCRIPTION OF THE PREFERRED EMBODIMENT

Figure 1:
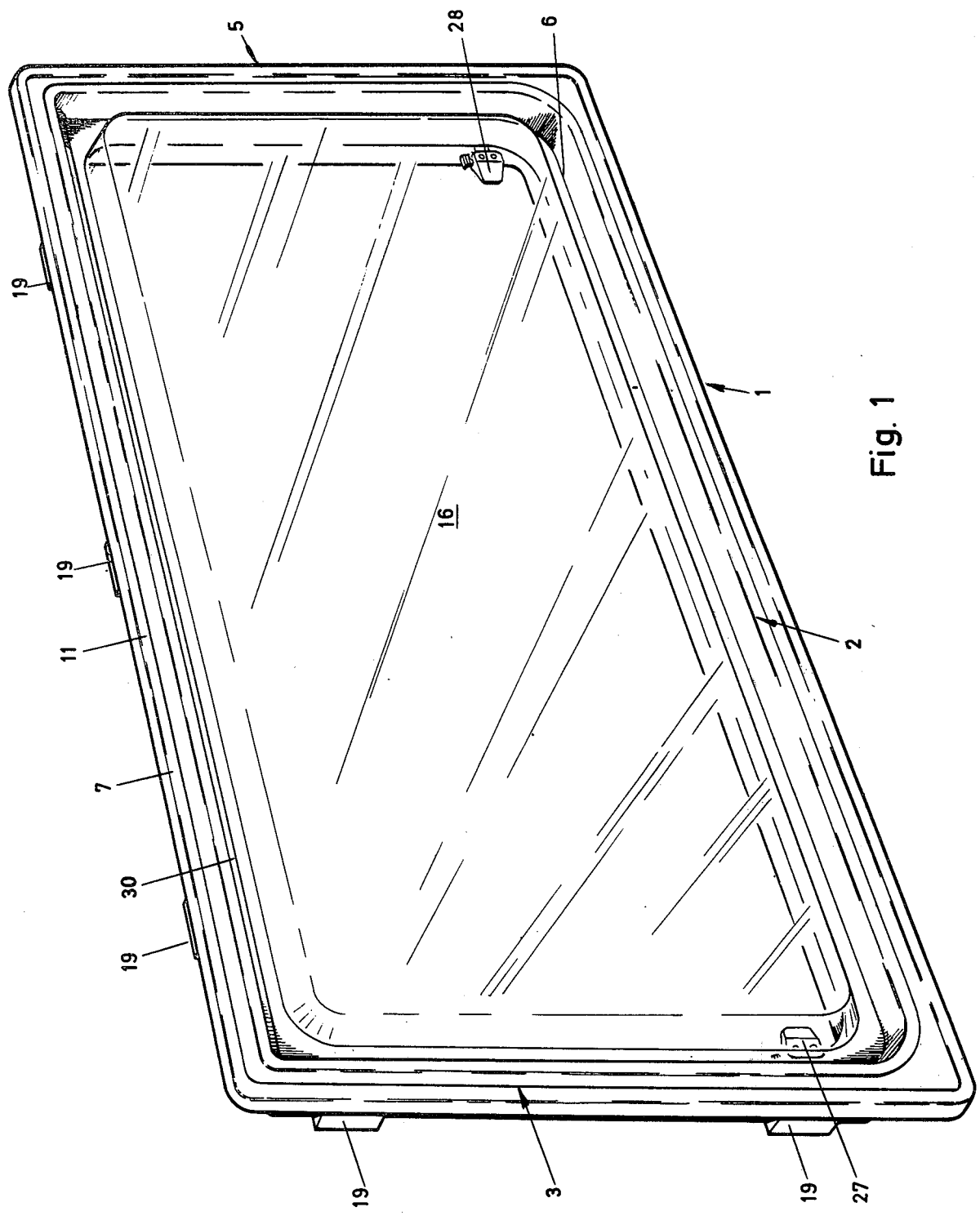
FIG. 1 is an installed window frame of the invention which contains a double acrylic plastic window.
Figure 2:
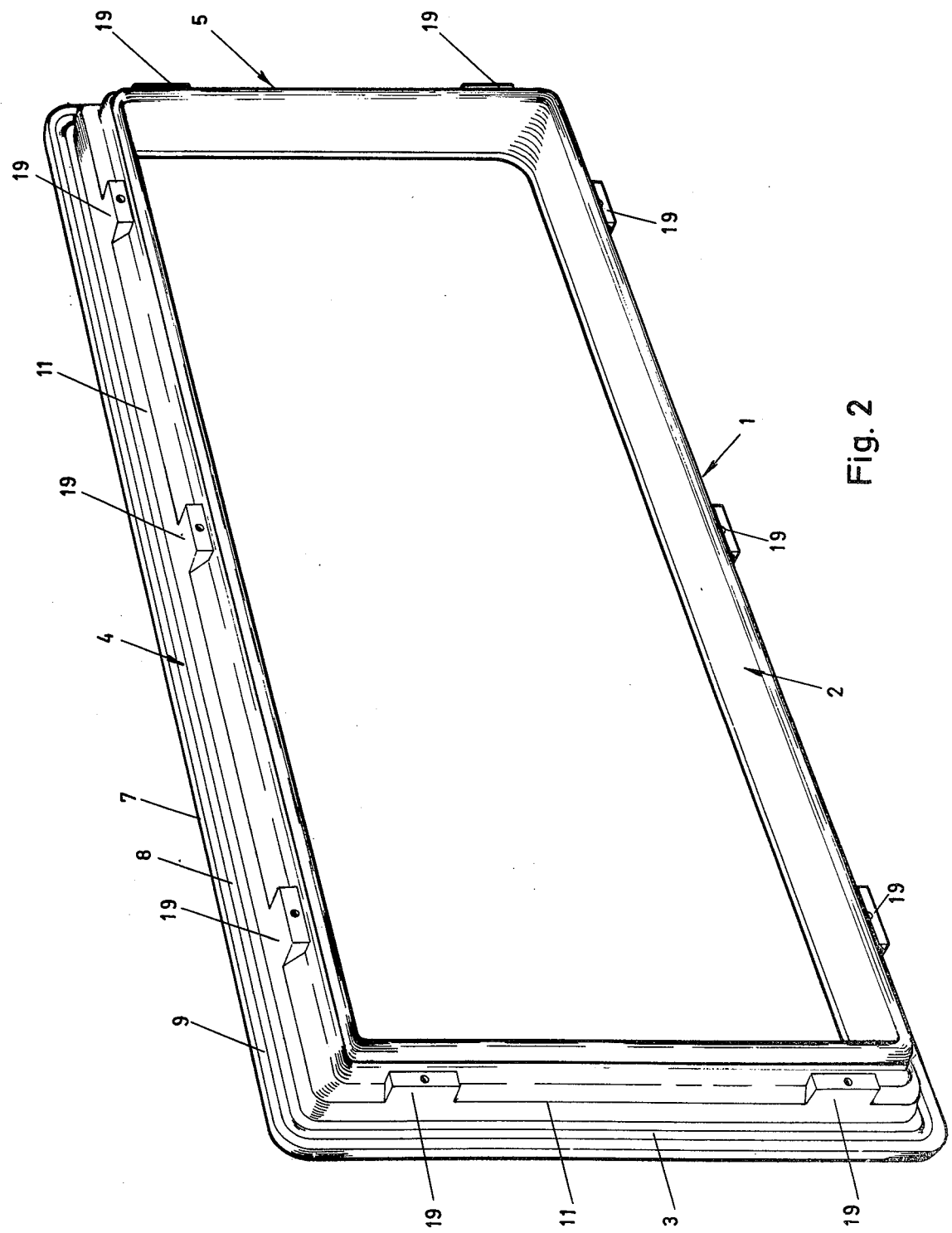
FIG. 2 is a rear view of the frame of FIG. 1 without the window.

The frame 1 cna be divided into pairs of parallel frame parts 2-5. Excluding the folded edge 6, which supports and positions the window with respect to the frame, the parts of the frame have a substantially L-shaped cross-section. The lower leg of the L-shaped cross-section consists of an edge flange 7, with a portion 8 which, when the frame is installed, is facing inwardly toward the outer wall and is provided with a groove 9 for sealing paste. Before installation, groove 9 is filled with a bead of sealing paste. Connected with groove 9 is a further narrow groove 10. When the frame is pressed into place, the excess sealing agent is pressed into groove 10, instead of being pressed outside the frame.

Figure 3:
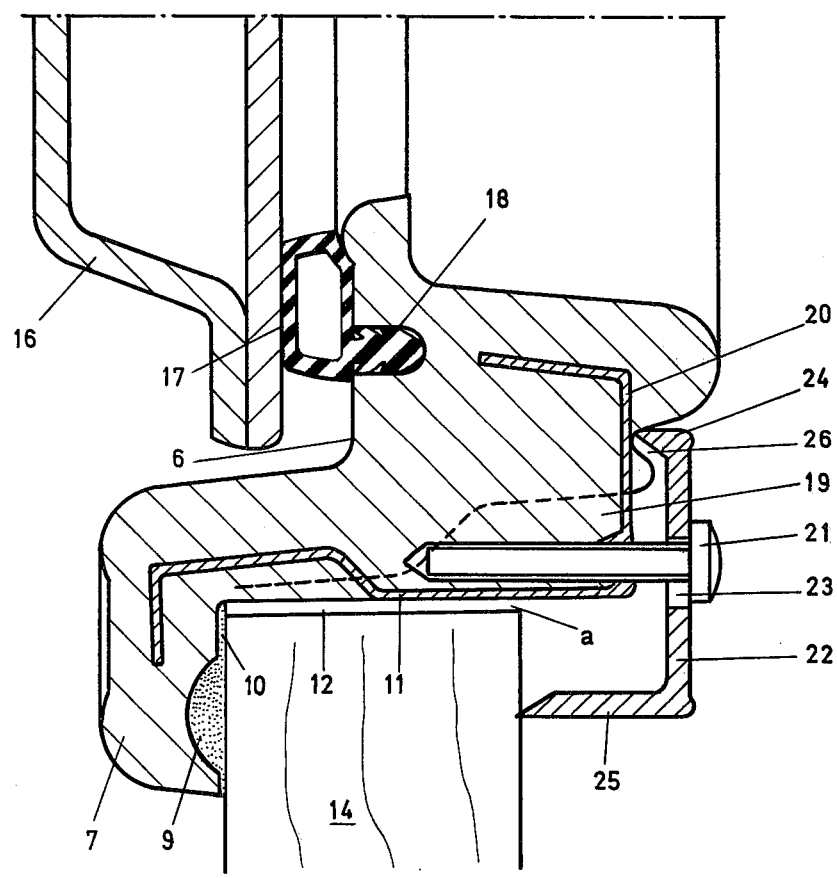
FIG. 3 is a detailed view of a frame installed in a wall which is thinner than the frame.

As shown in FIG. 3, a certain amount of play exists between side 11 of the frame and sides 12 and 13 of the wall opening. In FIG. 3, the wall 14 is thinner than the frame, and in FIG. 4 the wall 15 is thicker than the frame. The double-walled acrylic plastic window 16 is joined to the frame via a sealing strip 17. This sealing strip, which is made of a special rubber profile, is positioned in a groove 18 in the frame.

The frame itself may be made of injection moulded polyurethane. On the rear side of the frame there are a number of reinforcing lugs 19 with imbedded screw plates 20. These screw plates constitute fastening devices for screws 21 which connect the installed frame with four clamping strips 22. The clamping strips 22 may have extruded aluminum profiles. Their length corresponds to the length of the parts of the frame. Clamping strips 22 are provided with oval holes 23 for screws 21 which allow the window locks of the clamping strip to be obliquely set.

Figure 4:
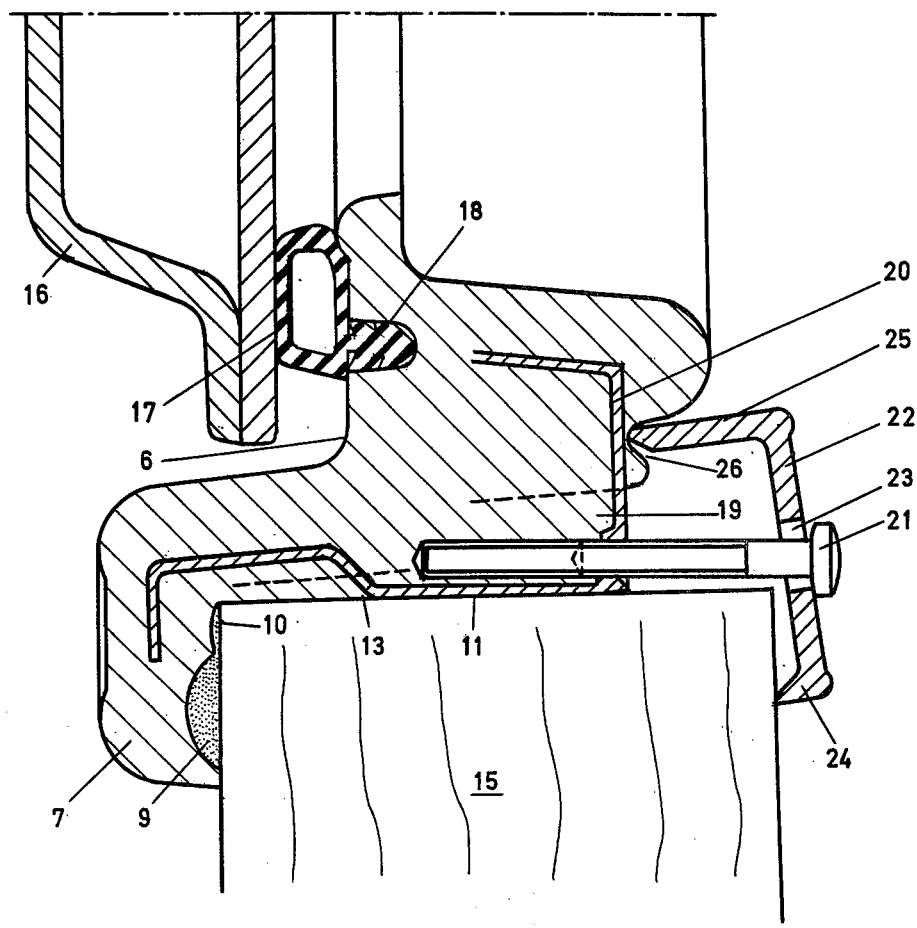
FIG. 4 is a detailed view of a frame installed in a wall which is thicker than the frame. DETAILED DE-

The clamping strips 22 of the present invention have the form of a shallow U-beam, with a central body which is wider than the lengths of the flanges 24, 25 of the U-beam. Flanges 24 and 25 may be formed of different lengths. As shown in FIGS. 3 and 4, their front surfaces can be ground to form a sharp edge which prevents slipping between frame 1 and clamping strip 22 or between clamping strip 22 and wall 14, 15.

As shown in FIGS. 3 and 4, by alternatively turning shorter flange 24 or longer flange 25 of clamping strip 22 towards frame 1, the clamping angle can be varied so that frame 1 will fit walls which are either thinner or thicker than the frame. The oblique setting of clamping strips 22 as shown in FIG. 4 further increases the flexibility of the frame assembly. The combination of polyurethane and metal clamping strips provides a very rigid unit, although neither frame 1 nor clamping strip 22 alone exhibits much rigidity.

In order to improve the contact between clamping strip 22 and frame 1, and to facilitate installation, frame 1 has been provided with a guide groove 26.

In FIG. 1, the window locks 27 and 28 as well as the hinge strip 30 are shown.

We claim:

1. A frame assembly for a door, window or the like which is adaptable for installation within a wall opening and comprising:
   a frame member including a flange portion abutting a side of said wall adjacent said wall opening;
   clamping means abutting both said frame member and the opposite side of said wall adjacent said wall opening;
   fastening means detachably connecting said clamping means with said frame member;
   said clamping means being adjustably disposed with a first flange portion abutting a groove formed in said frame member and a second flange portion abutting said opposite side of said wall adjacent said wall opening to clamp said frame member within a wall opening wider than said frame member; and
   said clamping means being further adjustably disposed with said first flange portion abutting said opposite side of said wall adjacent said wall opening and said second flange portion abutting said groove in said frame member to clamp said frame member within a wall opening narrower than said frame member.

2. Apparatus according to claim 1, wherein said frame member is formed with a protruding edge portion that includes a continuous groove;
   said groove supporting a ceiling strip for holding said window or door in position within said frame assembly.

3. Apparatus according to claim 1, wherein said frame member comprises a plurality of spaced reinforcing lugs with each lug including an embedded screw plate.

4. Apparatus according to claim 1, wherein said clamping means consists of a U-shaped member including two flange portions of unequal length, with said first flange portion being longer than said second flange portion.

5. Apparatus according to claim 4, wherein said U-shaped member includes a plurality of spaced oval holes corresponding to said reinforcement lugs,
   said fastening means comprising screws extending through said oval holes into said screw plates embedded in said reinforcement lugs, with said U-shaped member pivoting about said screw to clamp said frame member in wall openings of various thicknesses.

6. Apparatus according to claim 4, wherein said two flange portions are of equal length.

7. Apparatus according to claim 4, wherein said two flange portions include sharpened end surfaces which frictionally abut said groove in said frame member and said opposite side of the wall adjacent said wall opening.

8. Apparatus according to claim 1, wherein said frame member is constructed from an integral section of of polyurethane.

9. Apparatus according to claim 1, wherein a plurality of individual frame sections are joined to form said frame member.

10. Apparatus according to claim 1, wherein said flange portion of said frame member includes a groove facing said wall which is filled with ceiling paste for fastening said frame member to said firs side wall.

* * * * *